United States Patent
Sasaki et al.

(10) Patent No.: US 9,713,984 B2
(45) Date of Patent: Jul. 25, 2017

(54) VEHICLE-MOUNTED CAMERA

(71) Applicant: CLARION CO., LTD., Saitama (JP)

(72) Inventors: Hiroshi Sasaki, Tokyo (JP); Kota Irie, Saitama (JP); Hayato Tsuchihashi, Saitama (JP)

(73) Assignee: CLARION CO., LTD., Saitama (JP)

(*) Notice: Subject to any disclaimer, the term of this patent is extended or adjusted under 35 U.S.C. 154(b) by 0 days.

(21) Appl. No.: 14/914,897

(22) PCT Filed: May 1, 2014

(86) PCT No.: PCT/JP2014/062075
§ 371 (c)(1),
(2) Date: Feb. 26, 2016

(87) PCT Pub. No.: WO2015/029500
PCT Pub. Date: Mar. 5, 2015

(65) Prior Publication Data
US 2016/0207460 A1     Jul. 21, 2016

(30) Foreign Application Priority Data
Aug. 30, 2013 (JP) .................................. 2013-179284

(51) Int. Cl.
*G02B 1/10* (2015.01)
*B60R 1/00* (2006.01)
(Continued)

(52) U.S. Cl.
CPC .............. *B60R 1/00* (2013.01); *C03C 17/007* (2013.01); *C03C 17/34* (2013.01);
(Continued)

(58) Field of Classification Search
CPC ...... G02B 5/08; G02B 5/0808; G02B 5/0858; G02B 5/0866; G02B 1/10; G02B 1/18;
(Continued)

(56) References Cited

U.S. PATENT DOCUMENTS

2004/0196580 A1* 10/2004 Nakaho .................. G02B 5/08
                                                          359/507
2005/0233135 A1    10/2005 Iyer et al.
(Continued)

FOREIGN PATENT DOCUMENTS

JP        10-1913 A       1/1998
JP     2001-051108 A      2/2001
(Continued)

OTHER PUBLICATIONS

Korean Office Action for Application No. 10-2016-7004837 dated Dec. 26, 2016 (with English translation).
(Continued)

*Primary Examiner* — Euncha Cherry
(74) *Attorney, Agent, or Firm* — Volpe and Koenig, P.C.

(57) ABSTRACT

A lens provided on a surface of a vehicle-mounted camera has a problem that a field of view becomes undesirable because small water droplets caused by fog, light rain and others adhere and scatter incident light. In the vehicle-mounted camera provided on a periphery of a vehicle, a hydrophilic film made of silicon dioxide particles and binder is provided on the lens surface, a mean particle diameter of silicon dioxide particles dispersed on the lens side of the hydrophilic film is larger than a mean particle diameter of silicon dioxide particles on the side in contact with air space outside the vehicle-mounted camera. The mean particle diameter on the side affixed to the lens side out of the silicon dioxide particles is 40 to 100 nm, and the mean particle diameter on the side in contact with air space is 10 to 15 nm.

12 Claims, 6 Drawing Sheets

(51) Int. Cl.
*G03B 17/08* (2006.01)
*G02B 1/18* (2015.01)
*H04N 5/225* (2006.01)
*H04N 5/372* (2011.01)
*C03C 17/00* (2006.01)
*C03C 17/34* (2006.01)

(52) U.S. Cl.
CPC ............ *C03C 17/3417* (2013.01); *G02B 1/18* (2015.01); *G03B 17/08* (2013.01); *H04N 5/2254* (2013.01); *H04N 5/372* (2013.01); *B60R 2300/802* (2013.01); *C03C 2217/478* (2013.01); *G03B 2217/00* (2013.01)

(58) Field of Classification Search
CPC ... G02B 7/02; C03C 2217/478; C03C 17/007; C03C 17/34; C03C 17/3417; B60R 1/00; B60R 1/18; B60R 2300/802; G03B 17/02; G03B 15/00; G03B 17/08; G03B 2217/00
USPC ........................................................ 359/507
See application file for complete search history.

(56) References Cited

U.S. PATENT DOCUMENTS

| | | |
|---|---|---|
| 2008/0112050 A1 | 5/2008 | Nomura |
| 2011/0073142 A1 | 3/2011 | Hattori et al. |
| 2012/0118375 A1* | 5/2012 | Yoshikawa .......... H01G 9/2031 136/257 |

FOREIGN PATENT DOCUMENTS

| | | |
|---|---|---|
| JP | 2002-002766 A | 1/2002 |
| JP | 2002-080829 A | 3/2002 |
| JP | 2004-123996 A | 4/2004 |
| JP | 2009-265473 A | 11/2009 |
| JP | 2011-240910 A | 12/2011 |

OTHER PUBLICATIONS

European Search Report for Application No. 14840521.0 dated Jan. 3, 2017.

* cited by examiner

VEHICLE-MOUNTED CAMERA

TECHNICAL FIELD

The present invention relates to a vehicle-mounted camera mounted outside a vehicle for grasping a situation outside the vehicle, concretely relates to a vehicle-mounted camera where a hydrophilic film is formed on a surface of a lens to inhibit the disturbance of an image by the adhesion of water droplets to the camera lens.

BACKGROUND ART

To enhance safety in driving a vehicle, the popularization of a vehicle-mounted camera for observing a situation outside the vehicle such as rear verification and the recognition of a white line accelerates.

In some cases, the vehicle-mounted camera is installed inside a vehicle. However, since it is suitable to install the vehicle-mounted camera outside a vehicle so as to widely monitor an ambient situation, the vehicle-mounted camera is mainly installed outside a vehicle. When the vehicle-mounted camera is installed outside a vehicle, there is a case where it is difficult to grasp an ambient situation because water droplets adhere to a lens of the vehicle-mounted camera because of rainfall, snow coverage and others and scatter light incident on the camera. Therefore, technique for providing a mechanism that jets a clearing solvent onto the lens of the vehicle-mounted camera so as to clean a surface of the lens is disclosed in Patent Literature 1.

In Patent Literature 1, the cleaning device that jets the clearing solvent onto the vehicle-mounted camera is required and the replenishment of the clearing solvent is also required. Therefore, in a vehicle provided with the cleaning device, space for the cleaning device and a clearing solvent tank is required, and wiring for driving the cleaning device and piping for the clearing solvent are also required. Besides, a user who manages the vehicle has to replenish the clearing solvent.

As described above, as the cleaning device that jets the clearing solvent is required to secure space inside the vehicle and further, the user has to replenish the clearing solvent, technique that does not require these has been demanded.

It is considered that as water droplets turn into a water film when the surface of the lens is made hydrophilic, the scatter of light by the water droplets is inhibited and a field of view becomes satisfactory. For a method of making a surface of a lens hydrophilic, a method of forming a titanium dioxide containing film on the surface can be given. However, since the hydrophilic property of titanium dioxide does not emerge when no ultraviolet light irradiates it, its effect is not fulfilled in running at night.

In Patent Literature 2, technique for exerting a hydrophilic property even if no light irradiates is disclosed. This technique uses a film configured by inorganic oxide particles such as silicon dioxide and a void on a surface of a lens.

The inorganic oxide has a higher hydrophilic property in general compared with an organic substance, a glass plate made of silicon dioxide has a smaller contact angle with water, compared with a plate made of acrylic resin and others for example, and has the high hydrophilic property.

CITATION LIST

Patent Literature

Patent Literature 1: Japanese Unexamined Patent Application Publication No. 2011-240910

Patent Literature 2: Japanese Unexamined Patent Application Publication No. 2004-123996

SUMMARY OF INVENTION

Technical Problem

It is revealed by the inventors and others that as a result of discussing the use of a hydrophilic film made of silicon dioxide particles having a high hydrophilic property and a void on a surface of a lens, the whole surface of the film turns into a water film because the volume of a water drop becomes an amount to a certain extent in normal rain and a field of view is satisfactory, although when small droplets begin to adhere as in mist and light rain, a wet part and a dry part exist even if the film turns into a water film, and in such a case, light is scattered and a field of view is obstructed. There was a problem that as the whole surface turned into a water film when the number to a certain extent of small water droplets adhered as time elapsed, a field of view became satisfactory while a field of view was not satisfactory until a water film was formed.

An object of the present invention is to provide a vehicle-mounted camera where a hydrophilic film on which a water film is readily formed even if small water droplets slightly adhere to a surface of a lens is formed.

Then, after earnest discussion, the inventors and others found that a desired hydrophilic film could be formed by laminating plural films each of which was made of silicon dioxide particles in plural sizes and made the present invention. The present invention enhances a hydrophilic property of silicon dioxide itself by forming irregularities hardly having an effect optically on a surface of the hydrophilic film and enhances a hydrophilic property by increasing surface area due to the irregularities.

Solution to Problem

The present invention is based upon a vehicle-mounted camera provided to the periphery of a vehicle and has a characteristic that a hydrophilic film made of silicon dioxide particles having mean particle diameters in a predetermined range and binder having silicon dioxide as a principal component is provided on a surface of a lens provided on an outer surface of the camera, and of the silicon dioxide particles dispersed in the hydrophilic film, the mean particle diameter of silicon dioxide that exists on the side of the lens surface is larger than the mean particle diameter of silicon dioxide that exists on the side in contact with air space on the outer surface of the camera.

Advantageous Effects of Invention

According to the present invention, in the vehicle-mounted camera provided to the periphery of the vehicle, the hydrophilic film made of the silicon dioxide particles having the mean particle diameters in the predetermined range and the binder having silicon dioxide as the principal component is provided on the surface of the lens provided on the outer surface of the camera, and of the silicon dioxide particles dispersed in the hydrophilic film, the mean particle diameter of silicon dioxide that exists on the side of the lens surface is larger than the mean particle diameter of silicon dioxide that exists on the side in contact with air space on the outer surface of the camera, thus the vehicle-mounted camera that can grasp an ambient situation even in the beginning of rain and mist can be realized.

DESCRIPTION OF EMBODIMENTS

Figure 1A:
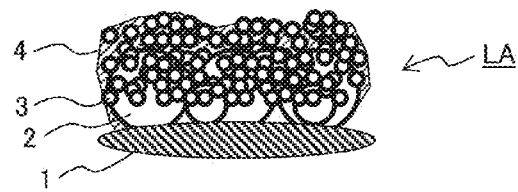
FIG. 1A is a schematic diagram showing a section of a hydrophilic film on a surface of a lens of a vehicle-mounted camera according to the present invention.

Referring to the drawings and others, an embodiment of the present invention will be described below.
[Hydrophilic Film on Lens Surface]
(1) Configuration of Hydrophilic Film A hydrophilic film formed on a lens of a vehicle-mounted camera according to the present invention is made of binder mainly including silicon dioxide, silicon dioxide particles each of which has a mean particle diameter of 10 to 15 nm and silicon dioxide particles each of which has a mean particle diameter of 40 to 100 nm. Hereinafter, the silicon dioxide particle having the mean particle diameter of 10 to 15 nm is called a smaller-diameter particle and the silicon dioxide particle having the mean particle diameter of 40 to 100 nm is called a larger-diameter particle.

Figure 1B:
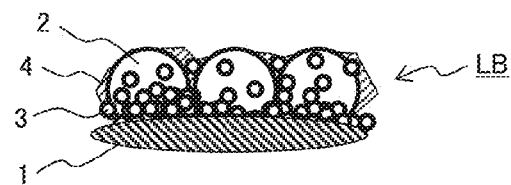
FIG. 1B is a schematic diagram showing a section of a hydrophilic film on the surface of the lens of the vehicle-mounted camera according to the present invention.
Figure 1C:
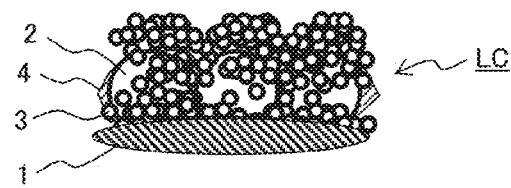
FIG. 1C is a schematic diagram showing a section of a hydrophilic film on the surface of the lens of the vehicle-mounted camera according to the present invention.

The configuration of the film is roughly classified into the following three types (A) to (C). FIGS. 1A to 1C are schematic diagrams showing sections of hydrophilic films on a lens surface of the vehicle-mounted camera according to the present invention.

(A) Hydrophilic Film where Smaller-Diameter Particles Lie in Surface Layer and Larger-Diameter Particles Lie in Surface Phase with Lens This is a hydrophilic film where a layer made of larger-diameter particles 2 of silicon dioxide is formed on a surface of a lens 1 as in a film LA shown in FIG. 1A and a layer made of smaller-diameter particles 3 of silicon dioxide is formed on the layer. The larger-diameter particle 2 and the smaller-diameter particle 3 are held on the surface of the lens 1 by binder 4 made of silicon dioxide. Since the film has both larger irregularities made of the larger-diameter particle 2 and smaller irregularities made of the smaller-diameter particle 3, the surface area is large and the hydrophilic property of the whole film is enhanced.

Figure 2:
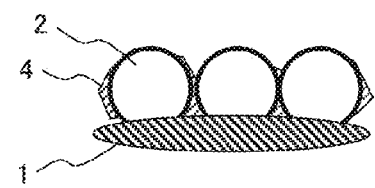
FIG. 2 is a schematic diagram showing a section of a hydrophilic film formed by larger-diameter particles.

As shown in FIG. 2, a surface of a film made of only larger-diameter particles has large irregularities and the surface looks milky in visual observation because of the scatter of light due to the irregularities of the surface. In this case, the film may obstruct a field of view.

In the present invention, the irregularities of the surface are reduced by laminating the layer of smaller-diameter particles on the layer of larger-diameter particles, resulting in the reduction of the cloudiness of the film, and further, a hydrophilic property is enhanced by providing fine irregularities formed by smaller-diameter particles.

(B) Hydrophilic Film where Smaller-Diameter Particles and Larger-Diameter Particles are Mixed This is a hydrophilic film formed so that larger-diameter particles 2 and smaller-diameter particles 3 exist in the whole film with them mixed as in a film LB in FIG. 1B and has structure that the smaller-diameter particles 3 come between the larger-diameter particles 2. As described in the type (A), the surface of the film formed by only the larger-diameter particles 2 has large irregularities, the surface looks milky in visual observation by the scatter of light due to the irregularities of the surface, and the film may obstruct a field of view. Then, irregularities of the surface are reduced by embedding the smaller-diameter particles 3 between the larger-diameter particles 2, resulting in the reduction of the cloudiness, and further, a hydrophilic property of the film is enhanced by providing fine irregularities formed by the smaller-diameter particles 3.

Further, it is considered that as clearance formed between the large-diameter particle and the smaller-diameter particle inside the film tries to incorporate water inside the film by a capillary phenomenon, a water droplet is extended and water droplets are turned into a water film, the film has a high hydrophilic property.

(C) Hydrophilic Film where Smaller-Diameter Particles Lie in Whole Film and Larger-Diameter Particles Lie in Surface Phase with Lens This is a hydrophilic film where larger-diameter particles lie in a surface phase with a lens and smaller-diameter particles exist in the whole film as in a film LC in FIG. 1C. Since this has both large irregularities by the larger-diameter particles and small irregularities on a surface of the film by the smaller-diameter particles like the film of the type (A), the surface area is increased and a hydrophilic property is enhanced. Further, like the film of the type (B), clearance between the large-diameter particle and the smaller-diameter particle inside the film tries to incorporate water inside the film by a capillary phenomenon, a water droplet is extended, water droplets are turned into a water film, and as a result, the hydrophilic property is enhanced. Therefore, since the film of the type (C) has both configurations of the films that further enhance the hydrophilic properties of the films of the types and (A) and (B), the hydrophilic property is further enhanced.

(2) Components of Hydrophilic Film

The hydrophilic film formed on the lens of the vehicle-mounted camera according to the present invention is made of the silicon dioxide particles different in size and binder. Since the lens on the outermost surface of the vehicle-mounted camera is generally made of glass in consideration of resistance to friction, the glass lens is main described in the following in the present invention. However, when resistance to friction is not required, resin such as acrylic and polycarbonate may also be used.

(A) Silicon Dioxide Particle

For a particle in the present invention, a particle made of silicon dioxide is used. When the size of the particle is represented as a mean particle diameter, a particle of size in a range of 10 to 100 nm for example is used. In one example, particles of two types of sizes of a smaller-diameter particle of 10 to 15 nm and a larger-diameter particle of 40 to 100 nm are used. For the reason why the material is silicon dioxide, it can be given that silicon dioxide is excellent in transparency and hydrophilicity. Further, another the reason why silicon dioxide is selected is that silicon dioxide is very hard and very transparent. Further, since the refractive index of silicon dioxide is also approximately 1.5 like that of glass, the reflection factor is low and the transmittance is high.

Figure 3:
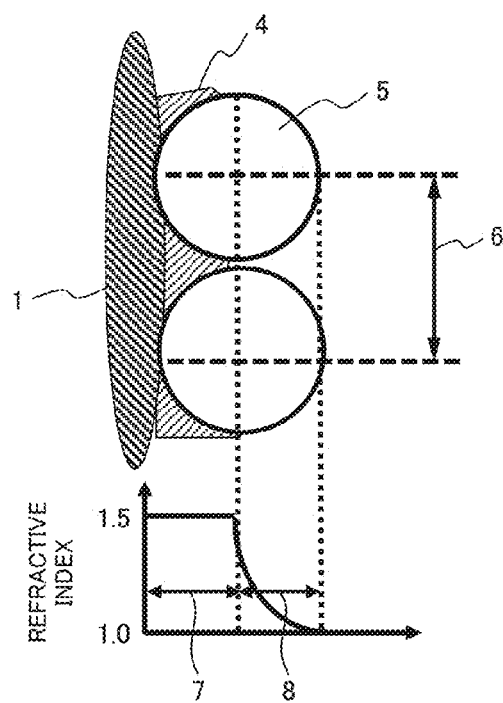
FIG. 3 is an explanatory drawing showing relation between the section of the hydrophilic film and a refractive index.

When a mean particle diameter of the particles exceeds 50 nm, a film formed by surface reflection becomes cloudy. However, the transmittance of light is higher than normal glass. FIG. 3 is an explanatory drawing showing relation between the section of the hydrophilic film and a refractive index.

FIGS. 1A to 1C and FIG. 2 show a state in which the lens is laid while FIG. 3 shows a state in which a lens 1 is stood so that its optical axis is horizontal.

As shown in FIG. 3, in a surface area 6 in which silicon dioxide particles 5 and binder 4 on a surface of a hydrophilic film are mixed, the refractive index of an area 7 filled with the silicon dioxide particles and the binder from a surface of the lens in a direction of the thickness of the hydrophilic film is approximately 1.5. However, air space the refractive index of which is 1.0 is mixed in a further right region in the drawing to be an area 8 in which silicon dioxide and air are mixed. In this area, the refractive index decreases from 1.5 and at a right end of the mixed area 8, the refractive index is approximately 1.0. That is, the refractive index of the vicinity of the surface of the hydrophilic film is lower than that of glass.

It is known that when the refractive index of a transparent member such as glass is n and the refractive index of air is 1, the reflection factor Ro of a surface of the transparent member is as follow.

$$Ro = \{(n-1)/(n+1)\}^2 \quad (1)$$

It is considered that when the refractive index of the surface of the lens decreases, the reflection factor of the lens can be reduced and the transmittance is enhanced.

(B) Binder

The hydrophilic film according to the present invention is made of silicon dioxide particles and the binder having silicon dioxide as a principal component. The binder is a substance mainly including silicon dioxide made by hardening a silicon compound having a hydrolyzable group by hydrolysis.

For the silicon compound having the hydrolyzable group, silica sol can be first given. This is a substance which is hydrolyzed by heating and changes to silicon dioxide. Silica sol is generally manufactured using tetraalkoxysilane for material. When tetraalkoxysilane is heated for a few hours on a condition of weak acidity, a part of an alkoxysilane group is hydrolyzed to be a hydroxyl group, this reacts to an alkoxysilane group in the vicinity, and silica sol the molecular weight of which is a few thousands is acquired, forming the bonding of silicon-oxygen-silicon. For tetraalkoxysilane, tetramethoxysilane, tetraethoxysilane, tetrapropoxysilane and tetrabutoxysilane can be given. In addition to these, a silicon compound including a chlorine radical such as silicon tetrachloride can also be given.

For a silicon compound having a hydrolyzable group to be material of the binder except silica sol, 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, N-phenyl-3-aminopropyltrimethoxysilane, N-phenyl-3-aminopropyltriethoxysilane, 3-chloropropyltrimethoxysilane, 3-chloropropyltriethoxysilane, 3-mercaptpropyltrimethoxysilane, 3-mercaptpropyltriethoxysilane, vinyltrimethoxysilane, vinyltriethoxysilane, 3-glycidoxypropyltrimethoxysilane, 3-glycidoxypropyltriethoxysilane, 3-methacryloxypropyltrimethoxysilane and 3-methacryloxypropyltriethoxysilane can be given.

Out of the abovementioned, 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, N-phenyl-3-aminopropyltrimethoxysilane and N-phenyl-3-aminopropyltriethoxysilane which have an amino group are made to have an amino group in the binder by hydrolysis. When the vehicle-mounted camera where this film is formed is left in an acidic condition as it is, the amino group has ammonium salt structure and a hydrophilic property increases. For example, when gas such as NOx and SOx included in exhaust gas dissolves in water, the gas is turned into nitric acid, sulfuric acid and others and turns in to be the water acidic. In an area where the rate of the gas is high, rainwater is also often acidic. As a part of the binder having the abovementioned amino group forms ammonium salt structure having a high hydrophilic property when the binder is exposed to acidic water, the hydrophilic property is further enhanced.

(3) Method of Producing Hydrophilic Film

Since a vacuum process such as deposition requires much electric power and it takes much time to produce a film, a method of wet coating in the air is adopted in the present invention. Concretely, the hydrophilic film is produced by preparing a coating solution required to form the hydrophilic film, applying it on the lens and drying it by heating.

As described above, the configuration of the hydrophilic film according to the present invention is roughly classified into the three types and the three types will be described below.

(A) Hydrophilic Film where Smaller-Diameter Particles Lie in Surface Layer and Larger-Diameter Particles Lie in Surface Phase with Lens When this film is formed, a coating solution including larger-diameter particles is first applied and afterward, is dried.

The hydrophilic film is produced by applying a coating solution including smaller-diameter particles on the coating solution and drying the coating solution.

(B) Hydrophilic Film where Smaller-Diameter Particles and Larger-Diameter Particles are Mixed This film is produced by preparing coating a solution where larger-diameter particles and smaller-diameter particles are mixed, applying and drying this coating solution.

(C) Hydrophilic Film where Smaller-Diameter Particles Lie in Whole Film and Larger-Diameter Particles Lie in Surface Phase with Lens This film is produced by first forming the film described in above (B) and drying the following applied coating solution after a coating solution including smaller-diameter particles is applied on the film described in (B).

Next, the details of a coating solution used for forming the hydrophilic film and a method of producing the film will be described.

(a) Preparing Coating Solution

The coating solution is prepared by mixing a binder solution and a solution in which silicon dioxide particles are dispersed. A method of preparing these two types of solutions will be described below.

(Preparing Binder Solution)

First, a method of preparing a silica sol solution will be described. A compound such as tetraethoxysilane described above is converted into silica sol having mean molecular weight of a few thousands by partially hydrolyzing the compound with acid such as nitric acid and succeeding polymerization reaction.

Except silica sol, a 3-aminopropyltrimethoxysilane solution for example is produced by dissolving 3-aminopropyltrimethoxysilane in alcohol such as ethanol.

(Dispersion Liquid of Silicon Dioxide Particles)

Next, dispersion liquid of silicon dioxide particles is prepared. The specific gravity of silicon dioxide is approximately 2.5 and relatively small in inorganic oxides. Therefore, dispersion liquid of silicon dioxide particles can be produced by adding dispersant such as ethylenglycolmonoalkylester, diethyleneglycolmonoalkylester, ethyleneglycolmonoalkylether and diethyleneglycolmonoalkylether to a solvent. This dispersion liquid is mixed with the abovementioned binder solution so as to produce a coating solution for forming a hydrophilic film.

For a solvent for the binder solution and the silicon dioxide particles dispersion liquid, alcohol having a hydroxyl group or ethyleneglycolmonoalkylether is desirable.

When environment in producing the film is very humid, moisture in air penetrates into coating a solution. At that time, a solvent which is insoluble in water becomes turbid. When moisture to or exceeding some extent penetrates in a coating solution, water and a solvent cause phase separation. Since water and a solvent of a coating solution separate in producing the film and dryness becomes uneven in both states, it is difficult to produce a uniform and flat hydrophilic film. Therefore, for a solvent of a coating solution, alcohol or ethyleneglycolmonoalkylether which is soluble or partially soluble in water is used.

As it takes much time to dry a solvent with a high boiling point which hardly volatilizes, it is desirable to enhance throughput that the boiling point is equal to or below 140° C. For a solvent equivalent to this, methanol, ethanol, 1-propanol, 2-propanol, 1-butanol, 2-butanol, t-butanol, 1-pentanol, 2-pentanol, 3-pentanol, t-pentanol and 2-ethoxyethanol can be given.

(B) Application Method

The coating solution produced above is applied to the lens of the vehicle-mounted camera. For an application method, a spraying method or a dip method of enabling application at normal temperature and under normal pressure is suitable.

The wettability of the lens is enhanced by exposing the lens to oxygen plasma or exposing it to ozone before application and dirt that slightly adheres can also be readily removed.

(4) Physical Property of Hydrophilic Film

A result of investigating relation between the surface roughness and others of the hydrophilic film on the lens surface of the vehicle-mounted camera according to the present invention and a hydrophilic property is as follows.

Since particles having arithmetic mean roughness (Ra) of the hydrophilic film form irregularities of the surface increase the surface area and enhance a hydrophilic property, the size to some extent is required. In the present invention, a lower limit of the Ra of the hydrophilic film is 2.5 nm and a sufficient hydrophilic property is secured at this value. It is considered that a lower limit, of a mean particle diameter of a used particle is 10 nm, thus the lower limit is 2.5 nm because the particle is embedded in the binder and between other particles.

When the surface is too rough, light is scattered and the optical transparency is deteriorated. The vehicle-mounted camera is required to transmit light in a visible region (approximately 400 to 700 nm). As a result of the investigation of a region in which the scattering of light having a wavelength in this region hardly occurs, the scattering is equal to or below 5% of irradiation light when the Ra is 50 nm. However, when the Ra exceeds 50 nm, light is rapidly readily scattered, when the Ra is 55 nm, the scattering increases up to approximately 10% of irradiation light, and the transmittance of light is deteriorated by 10% or more. The scattering is especially strong when light has a short wavelength and in the case of light having a shorter wavelength, the transmittance of the light is further deteriorated. It is desirable that an upper limit of the Ra is 50 nm on the basis of the abovementioned result. It proves from the abovementioned result that as to the Ra, a range of 2.5 to 50 nm is desirable.

Next, as a result of the investigation of the maximum depth (Rv) of the surface roughness of the hydrophilic film, it proves that as to the Rv, a range of 6 to 15 nm is desirable. When the depth is too small, the hydrophilic property is deteriorated. This is because the depth is required to be large to some extent so that water penetrates via clearance between particles like a capillary phenomenon and the required depth is 6 nm in an experiment. Besides, when the depth is too large, dirt except water enters in a case of 16 nm or larger in the concrete and it is considered that the hydrophilic property is deteriorated.

In the meantime, as a result of investigating the maximum peak (Rp) of the surface roughness of the hydrophilic film, it proves that as to the Rp, a range of 20 to 70 nm is desirable. Since the surface roughness itself becomes too small when the Rp is too small, and since light is scattered and the transparency is deteriorated when the Rp is too large, it is considered that the range of 20 to 70 nm is optimum.

Next, the thickness of the hydrophilic film was examined. As for the thickness, structure that approximate one or two larger-diameter particles are overlapped in a direction of the thickness and one to five smaller-diameter particles are overlapped on the overlapped larger-diameter particles is desirable. Since the mean particle diameter of the larger-diameter particles is 40 to 100 nm and the mean particle diameter of the smaller-diameter particles is 10 to 15 nm, it is desirable that the thickness of the hydrophilic film is approximately 50 to 250 nm. Hereby, since water enters clearance between particles by a capillary phenomenon and a water film is formed, the hydrophilic property is enhanced.

When the hydrophilic film is thicker than 50 to 250 nm, it becomes weak in friction. Further, when the film is too thin, particles are separated so as not to allow a phenomenon in which water enters clearance between particles by a capillary phenomenon. Accordingly, it is desirable that the thickness is 50 to 250 nm.

[Camera Provided with Lens to which Hydrophilization Treatment is Applied]

Figure 4:
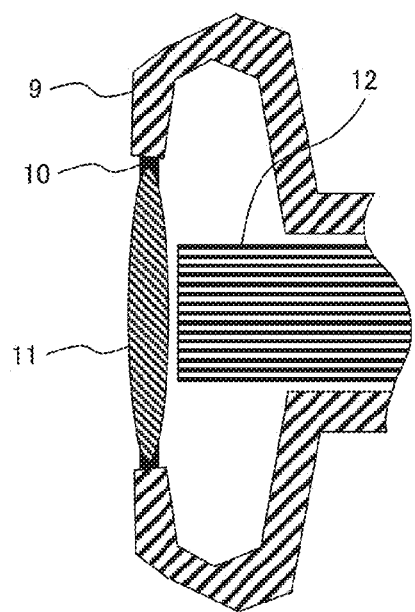
FIG. 4 is a schematic diagram showing a section of the vehicle-mounted camera according to the present invention.

FIG. 4 is a schematic diagram showing the section of the vehicle-mounted camera according to the present invention. A lens 11 coated with a hydrophilic film is attached to a camera case 9 via a gasket 10. CCD 12 is provided inside the lens 11, reads image information input via the lens 11, and transmits the read image information to an image processing unit (omitted in FIG. 4). In the present invention, the lens is slightly cloudy because of large silicon dioxide particles and is hazier, compared with a transparent lens. In that case, the deterioration by cloudiness of the transmittance can be inhibited as much as possible by arranging the CCD as near to a surface of the lens as possible.

A haze of the lens 11 of the vehicle-mounted camera according to the present invention is equal to or below 1. However, when the CCD 12 is separated from the lens by approximately 4 mm, input luminous energy decreases by approximately 2% than input luminous energy when the CCD 12 is separated by 3 mm. The difference in the transmittance of light between a case where distance between the CCD 12 and the lens 11 is equal to or below 3 mm and a state in which the CCD is in contact with the lens 11 is equal to or below 0.5%, so it is desirable that the distance between the CCD and the lens is equal to or below 3 mm.

[Application of Vehicle-Mounted Camera According to Present Invention]

As for the vehicle-mounted camera according to the present invention, application as a back monitor for rear verification is conceivable. In addition, application for recognizing a white line on a road, automatically controlling an accelerator, a brake and a steering wheel using the white line for a guide and functioning as eyes of a system that automatically runs is conceivable. Further, application as a monitor via which a rear situation and a diagonally rear situation heretofore depending upon verification via door mirrors and a rearview mirror can be verified is also conceivable. Moreover, application as a monitor for remotely operating a crane truck, an excavator, a dump car and others that are respectively automatically driven in very bad environment is also conceivable. In addition, application as a monitor for remotely operating a pilotless railroad vehicle is also conceivable.

Embodiments of the present invention will be described below.

First Embodiment

In a first embodiment, contents of a hydrophilic film formed on a lens of a vehicle-mounted camera according to the present invention and the lens will be described.

(1) Preparing Coating Solution for Forming Hydrophilic Film

After silicon dioxide particles (30 pts·wt.) having a mean particle diameter of 10 to 15 nm and ethyleneglycol monobutylate (5 pts·wt.) are mixed, ethanol (965 pts·wt.) is added little by little while agitating it. This liquid is called a particle mixture.

Tetraethoxysilane (70 pts·wt.) is dissolved in ethanol (980 pts·wt.), extremely small quantity of nitric acid is added, and the produced liquid is heated at 50° C. for approximately one hour. As a result, the solvent is volatilized by approximately 1 wt. % at the density of silicon and silica sol (1000 pts·wt.) of approximately 2 wt. % at the density of silicon dioxide after heat curing is acquired. The whole quantity of the particle mixture produced before is added to the acquired silica sol and coating solution produced as described above and including the silicon dioxide particles having the mean particle diameter of 10 to 15 nm is called coating solution A.

Next, a coating solution including silicon dioxide particles having a mean particle diameter of 70 to 100 nm is produced. For a method of producing this solution, the coating solution is produced by the similar method to the method when the abovementioned coating solution A is produced except that the silicon dioxide particles (30 pts·wt.) having the mean particle diameter of 70 to 100 nm is used in place of the silicon dioxide particles (30 pts·wt.) having the mean particle diameter of 10 to 15 nm. The coating solution including the silicon dioxide particles having the mean particle diameter of 70 to 100 nm is called coating solution C.

(2) Forming Hydrophilic Film on Lens

A hydrophilic film is formed on the lens using the coating solution A and the coating solution C. Application by a method of dipping will be described below. First, the lens is fixed to a pull-up jig of a dipping device so that a light transmitting surface of the lens is horizontal. At first, for a coating solution, the coating solution C is used. The lens is inserted into a vessel including the coating solution C to dip the lens in the coating solution C and afterward, the lens is pulled up from the coating solution C at the pulling speed of 0.75 mm/sec. After the lens is pulled up, the lens is put in a constant-temperature bath of 80° C. for one hour, is extracted, and is cooled until the temperature lowers to room temperature.

Next, the coating solution A is applied to the lens and is heated by the similar method to the coating solution C. As a result, a hydrophilic film (a hydrophilic film-1) having structure equivalent to the LA shown in FIG. 1A is formed on the lens.

Figure 5:
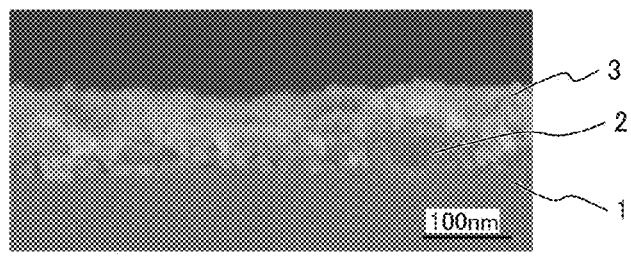
FIG. 5 shows a photograph showing a section of a hydrophilic film on a surface of a lens of a vehicle-mounted camera according to a first embodiment of the present invention.

FIG. 5 shows a photograph showing a section of the hydrophilic film-1. Structure in which smaller-diameter particles exist on large-diameter particles can be verified. As binder made of silicon dioxide is too thin to verify the binder in this photograph, the binder is not shown by an arrow. Further, binder made of silicon dioxide is not shown in the following photographs for the similar reason.

Second Embodiment

Next, a method of forming a hydrophilic film having structure equivalent to the LB shown in FIG. 1B will be described. The coating solution A and the coating solution C produced in the second embodiment are mixed by an equal amount. The produced coating solution is called coating solution D.

The coating solution D is applied to a lens and is heated in a similar method to the one for the coating solution C. As a result, a hydrophilic film (a hydrophilic film-2) having structure equivalent to the LB shown in FIG. 1B is formed on the lens.

Figure 6:
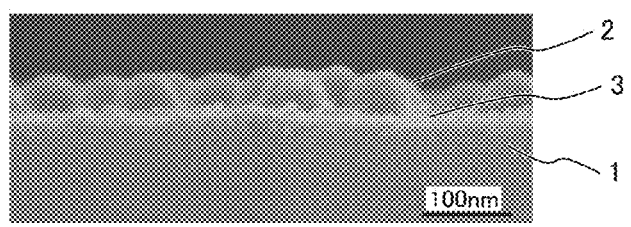
FIG. 6 shows a photograph showing a section of a hydrophilic film on a surface of a lens of a vehicle-mounted camera according to a second embodiment of the present invention.

FIG. 6 shows a photograph showing a section of the hydrophilic film-2. Structure in which larger-diameter particles and smaller-diameter particles exist as shown in FIG. 1B can be verified.

Third Embodiment

Next, a method of forming a hydrophilic film in a third embodiment will be described. Larger-diameter particles having a smaller mean particle diameter of 40 to 50 nm are used in place of the larger-diameter particles having the mean particle diameter of 70 to 100 nm in the second embodiment, and a coating solution including silicon dioxide particles having the mean particle diameter of 40 to 50 nm is produced. A method of producing this solution is similar to the method when the coating solution A is produced except that silicon dioxide particles (30 pts·wt.) having the mean particle diameter of 40 to 50 nm are used in place of the silicon dioxide particles (30 pts·wt.) having the mean particle diameter of 10 to 15 nm. The coating solution including the silicon dioxide particles having the mean particle diameter of 40 to 50 nm is called coating solution B. The coating solution A produced as described above and the coating solution B are mixed by an equal amount. This is called coating solution E.

The coating solution E is applied to a lens and is heated in a similar method to the one for the coating solution C. As a result, a hydrophilic film (a hydrophilic film-3) having structure equivalent to the LB shown in FIG. 1B is formed on the lens.

Fourth Embodiment

Next, a method of forming a hydrophilic film having structure equivalent to the structure shown in FIG. 1C will be described. The coating solution D is applied and heated in a similar method to the one for the coating solution C. As a result, a hydrophilic film (a hydrophilic film-2) having structure equivalent to the LB shown in FIG. 1B is formed on a lens. Next, a hydrophilic film (a hydrophilic film-4) having structure equivalent to the structure shown in FIG. 1C is formed on the lens by similarly applying the coating solution A to the hydrophilic film-2 and heating it.

Figure 7:
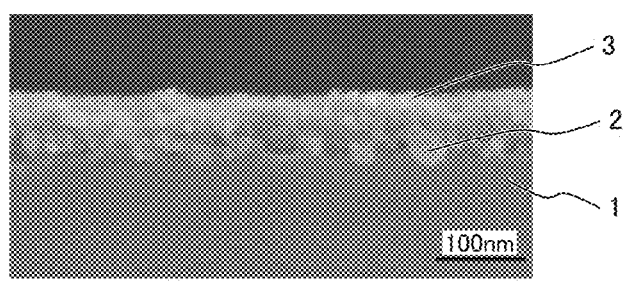
FIG. 7 shows a photograph showing a section of a hydrophilic film on a surface of a lens of a vehicle-mounted camera according to a fourth embodiment of the present invention.

FIG. 7 shows a photograph showing a section of the hydrophilic film-4. Structure in which larger-diameter particles and smaller-diameter particles exist as in the LC shown in FIG. 1C can be verified.

(3) Evaluation of Hydrophilic Property

Each contact angle with water of the hydrophilic film-1 to the hydrophilic film-4 produced as described above was equal to or below 5°. Since a contact angle with water of the lens before the hydrophilic films were formed was approximately 30°, a hydrophilic property of the formed films was verified.

Comparative Example 1

(1) Forming Hydrophilic Film on Lens

Figure 8:
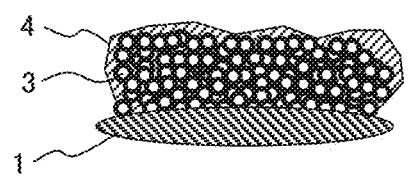
FIG. 8 is a schematic diagram showing a section of a hydrophilic film on a surface of a lens of a vehicle-mounted camera in a comparative example 1 of the present invention.
Figure 9:
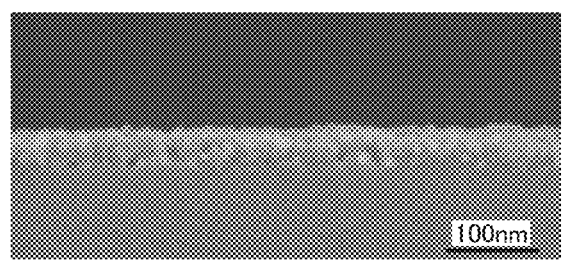
FIG. 9 shows a photograph showing the section of the hydrophilic film on the surface of the lens of the vehicle-mounted camera in the comparative example 1 of the present invention.

A hydrophilic film (a hydrophilic film-5) having structure equivalent to structure shown in FIG. 8 is formed on a lens by applying only the coating solution A produced in the first embodiment to the lens as in the first embodiment and heating it. FIG. 9 shows a photograph showing a section of the hydrophilic film.

Figure 10:
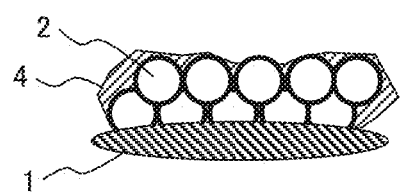
FIG. 10 is a schematic diagram showing a section of a hydrophilic film on a surface of a lens of a vehicle-mounted camera in the comparative example 1 of the present invention.
Figure 11:
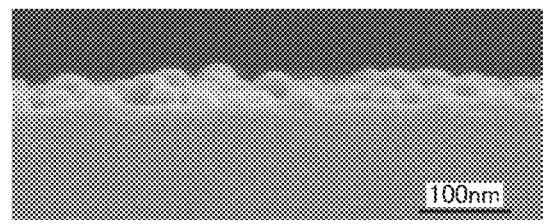
FIG. 11 shows a photograph showing the section of the hydrophilic film on the surface of the lens of the vehicle-mounted camera in the comparative example 1 of the present invention.

A hydrophilic film (a hydrophilic film-6) having structure equivalent to structure shown in FIG. 10 is formed on a lens by similarly applying only the coating Solution B produced in the first embodiment to the lens as in the first embodiment and heating it. FIG. 11 shows a photograph showing a section of the hydrophilic film.

Figure 12:
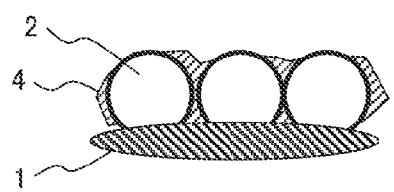
FIG. 12 is a schematic diagram showing a section of a hydrophilic film on a surface of a lens of a vehicle-mounted camera in the comparative example 1 of the present invention.
Figure 13:
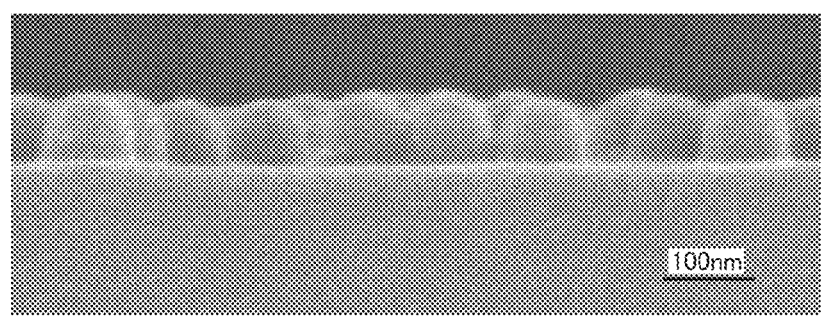
FIG. 13 shows a photograph showing the section of the hydrophilic film on the surface of the lens of the vehicle-mounted camera in the comparative example 1 of the present invention.

A hydrophilic film (a hydrophilic film-7) having structure equivalent to structure shown in FIG. 12 is formed on a lens by similarly applying only the coating solution C produced in the first embodiment to the lens as in the first embodiment and heating it. FIG. 13 shows a photograph showing a section of the hydrophilic film.

(2) Evaluation of Hydrophilic Property

Each contact angle with water of the hydrophilic film-5 to the hydrophilic film-7 produced as described above was equal to or below 5°. Since a contact angle with water of the lens before the hydrophilic films were formed is approximately 30°, a hydrophilic property of the formed films was verified.

(3) Evaluation of Hydrophilic Property by Exposure to Steam

As a result of measuring the contact angle used for a scale of wettability of the hydrophilic film-1 to the hydrophilic film-7 in the embodiments and the comparative example of the present invention, each contact angle with water was equal to or below 5° and it was difficult to compare the hydrophilic films. Then, fine water droplets were made to adhere to the hydrophilic films using a humidifier and a hydrophilic property was evaluated by the visibility of a character depending upon an adherence state of the water droplets immediately thereafter.

Concretely, the lens on which the hydrophilic film was formed was held in a position apart by 50 nm from a steam exhaust nozzle of a steam type humidifier (HLF-350 manufactured by Hitachi Living Supply) for fixed time, then immediately after that, the lens was put on a printed matter the character size of which was 10 points and the font of which is a Mincho typeface having a surface exposed to steam on the upside, the visibility of a character was evaluated by visual observation, and a degree of cloudiness was evaluated. In a case where exposure time is short, the lens becomes cloudy when steam adheres in a state of water droplets and a character is hardly visible. However, when exposure time is extended, steam is turned into a water film, the lens is not made cloudy, and the character becomes visible. Further, since steam is readily turned into a water film when a hydrophilic property is higher, a character becomes visible in short time. As described above, a hydrophilic property was evaluated depending upon the visibility of a character.

A table 1 shows the result.

TABLE 1

Result of comparing visibility after exposure to steam by humidifier

| Hydrophilic film type | Exposure time | | | |
|---|---|---|---|---|
| | 2 sec. | 5 sec. | 10 sec. | 15 sec. |
| Hydrophilic film-1 | ◯ | ◯ | ◯ | ◯ |
| Hydrophilic film-2 | ◯ | ◯ | ◯ | ◯ |
| Hydrophilic film-3 | ◯ | ◯ | ◯ | ◯ |
| Hydrophilic film-4 | ◯ | ◯ | ◯ | ◯ |

TABLE 1-continued

Result of comparing visibility after exposure to steam by humidifier

| Hydrophilic film type | Exposure time | | | |
|---|---|---|---|---|
| | 2 sec. | 5 sec. | 10 sec. | 15 sec. |
| Hydrophilic film-5 | x | x | o | o |
| Hydrophilic film-6 | x | x | x | o |
| Hydrophilic film-7 | x | x | x | o |

Visibility:
o; Character is legible,
x; Character is partially illegible

As for the hydrophilic film-1 to the hydrophilic film-4, a character was legible when exposure time was 2 seconds. However, as to the hydrophilic film-5, a character was illegible without exposure for 10 seconds and as to the hydrophilic film-6 and the hydrophilic film-7, it was difficult to read a character without exposure for 15 seconds.

The abovementioned result told that the hydrophilic film having larger-diameter particles on the lens side and having smaller-diameter particles on the side of air space or the hydrophilic film where larger-diameter particles and smaller-diameter particles were mixed had a higher hydrophilic property, compared with a hydrophilic film configured by particles of the approximately same extent in size. Especially, it proved that a change of water droplets to a water film when small water droplets slightly adhered most often occurred and cloudiness by the adherence of slight water droplets could be inhibited.

Comparative Example 2

Each lens to which the hydrophilic film-1 to the hydrophilic film-4 produced in the first to fourth embodiments and the hydrophilic film-5 to the hydrophilic film-7 produced in the comparative example 1 were respectively applied was mounted in the vehicle-mounted camera shown in FIG. 4. A part of each lens of the vehicle-mounted camera is held in a position apart by 50 mm from a steam exhaust nozzle of the humidifier used in the comparative example 1 for fixed hours, and immediately after that, it was checked whether a white line on a road in a position far by 10 m from the lens could be visually verified on a monitor that displays image information of the vehicle-mounted camera. In the comparative example 1, a hydrophilic property was evaluated depending upon whether a character was legible or not. However, in the comparative example 2, in place of a character, a hydrophilic property was evaluated depending upon a white line on a road.

A table 2 shows the result.

TABLE 2

White line visibility comparison result

| Hydrophhilic film type | Exposure time | | | |
|---|---|---|---|---|
| | 2 sec. | 5 sec. | 10 sec. | 15 sec. |
| Hydrophilic film-1 | o | o | o | o |
| Hydrophilic film-2 | o | o | o | o |
| Hydrophilic film-3 | o | o | o | o |
| Hydrophilic film-4 | o | o | o | o |
| Hydrophilic film-5 | x | x | o | o |
| Hydrophilic film-6 | x | x | o | o |
| Hydrophilic film-7 | x | x | o | o |

Visibility:
o; White line is visible,
x; White line is partially invisible

As for the hydrophilic film-1 to the hydrophilic film-4, a white line could be recognized when exposure time was 2 seconds. However, as to the hydrophilic film-5 to the hydrophilic film-7, unless they were exposed for 10 seconds, a white line could not be verified.

The abovementioned result of this experiment told that the hydrophilic film having larger-diameter particles on the lens side and having smaller-diameter particles on the side of air space or the hydrophilic film where larger diameter particles and smaller-diameter particles were mixed had a higher hydrophilic property, compared with a hydrophilic film configured by particles of the approximately same extent in size. Especially, it proved that a change of water droplets when small water droplets slightly adhere to a water film often occurred and cloudiness by the adherence of slight water droplets could be inhibited.

Comparative Example 3

Figure 14:
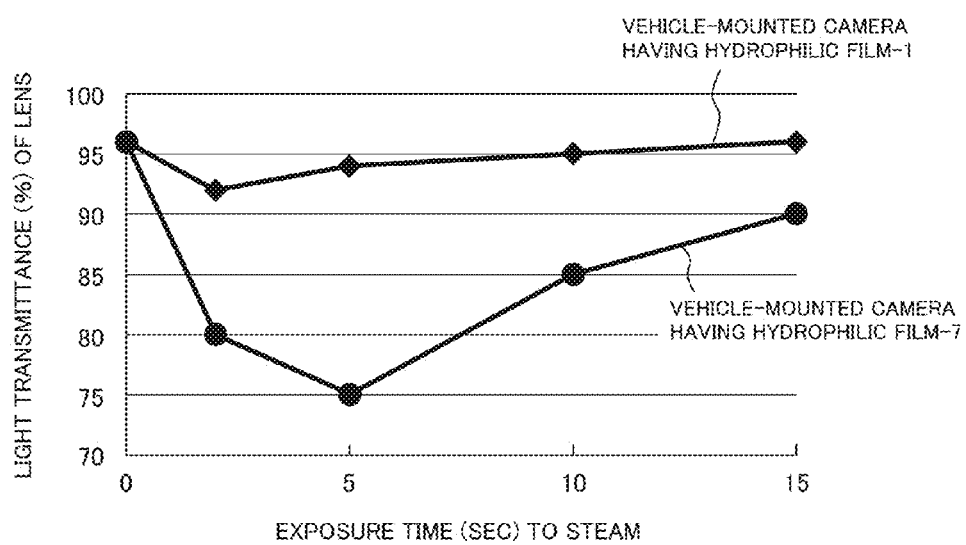
FIG. 14 is an explanatory drawing showing relation between light transmittance of the lens of the vehicle-mounted camera and exposure time to steam.

The variation depending upon exposure to steam of mean light transmittance in vehicle-mounted cameras 360 to 760 nm thick having each lens on which the hydrophilic film-1 or the hydrophilic film-7 produced in the comparative example 2 was formed was investigated. FIG. 14 shows the result.

In the case of the lens on which the hydrophilic film-1 was formed, light transmittance before exposure to steam was approximately 96%. After exposure for 2 seconds, the light transmittance lowered to approximately 92%. However, after exposure for 5 seconds, the light transmittance recovered to approximately 94%, and after exposure for 10 seconds, the light transmittance recovered to approximately 95%.

In the case of the lens on which the hydrophilic film-7 was formed, light transmittance before exposure to steam was also approximately 96%. However, after exposure for 2 seconds, the light transmittance lowered to approximately 80%, and after exposure for 5 seconds, the light transmittance lowered to approximately 70%.

Afterward, although the light transmittance recovered, even after exposure for 10 seconds, the light transmittance recovered to only 85%.

When the lens on which the hydrophilic film-7 is formed was visually observed, water droplets due to steam started to adhere to a surface of the lens when the lens started to be exposed to steam and after exposure for 5 seconds, water droplets became rather dense. After exposure for 10 seconds, water droplets became together and were turned into a water film, and as a result, the light transmittance also recovered.

When the lens on which the hydrophilic film-1 is formed is visually observed, water droplets due to steam start to adhere to a surface of the lens when the lens starts to be exposed to steam. However, in approximately 3 seconds, water droplets are turned into a water film, and the water film cannot be recognized as water droplets.

The abovementioned result clarified that as to the hydrophilic film having larger-diameter particles on the lens side and having smaller-diameter particles on the side of air space or the hydrophilic film where larger-diameter particles and smaller-diameter particles were mixed, the deterioration at the beginning of the adherence of water droplets of light transmittance could also be inhibited.

LIST OF REFERENCE SIGNS

1—Lens, 2—Larger—diameter particle, 3—Smaller—diameter particle, 4—Binder, 5—Silicon dioxide particle, 6—Surface area where silicon dioxide particles and binder are mixed, 7—Area filled with silicon dioxide particles and binder, 8—Area where silicon dioxide and air are mixed, 9—Camera case, 10—Gasket, 11—Lens coated with hydrophilic film, 12—CCD

The invention claimed is:

1. A vehicle-mounted camera provided on a periphery of a vehicle,
wherein a hydrophilic film including different two types of silicon dioxide particles having a mean particle diameter in a predetermined range and binder mainly made of silicon dioxide is provided on a surface of a lens provided on an outer surface of the camera;
of the different two types of silicon dioxide particles having the mean particle diameter in the predetermined range, the silicon dioxide particles having the larger mean particle diameter adhere to the surface of the lens; and
the silicon dioxide particles having the smaller mean particle diameter adhere to a surface on the side of air space of the silicon dioxide particles having the larger mean particle diameter.

2. The vehicle-mounted camera according to claim 1, wherein the silicon dioxide particles having the smaller mean particle diameter adhere to the whole surface of irregularities formed by the silicon dioxide particles having the larger mean particle diameter.

3. The vehicle-mounted camera according to claim 1, wherein irregularities are formed on the whole surface of the irregularities formed by the silicon dioxide particles having the larger mean particle diameter by the silicon dioxide particles having the smaller mean particle diameter.

4. The vehicle-mounted camera according to claim 1, wherein the mean particle diameter of the silicon dioxide particles in the hydrophilic film is 10 to 100 nm.

5. The vehicle-mounted camera according to claim 4, wherein the mean particle diameter of silicon dioxide that exists on the side which is in contact with air space of the outer surface of the camera is 10 to 15 nm.

6. The vehicle-mounted camera according to claim 5, wherein of the silicon dioxide particles included in the hydrophilic film, the mean particle diameter of silicon dioxide that exists on the side of the lens surface is 70 to 100 nm.

7. The vehicle-mounted camera according to claim 5, wherein of the silicon dioxide particles included in the hydrophilic film, the mean particle diameter of silicon dioxide that exists on the side of the lens surface is 40 to 50 nm.

8. The vehicle-mounted camera according to claim 1, wherein the hydrophilic film including the silicon dioxide particles and the binder has an amino group.

9. The vehicle-mounted camera according to claim 1, wherein mean thickness of the hydrophilic film including the silicon dioxide particles and the binder is 50 to 250 nm; and
the arithmetic surface roughness (Ra) is 2.5 to 50 nm.

10. The vehicle-mounted camera according to claim 9, wherein a maximum depth (Rv) of the surface roughness of the hydrophilic film is 6 to 15 nm.

11. The vehicle-mounted camera according to claim 9, wherein a maximum peak (Rp) of the surface roughness of the hydrophilic film is 20 to 70 nm.

12. The vehicle-mounted camera according to claim 1, wherein distance between a surface of an image information acquisition unit in CCD provided inside the vehicle-mounted camera and the lens is equal to or below 3 mm.

* * * * *